United States Patent
Gorchkov et al.

(10) Patent No.: US 6,916,579 B2
(45) Date of Patent: Jul. 12, 2005

(54) CATHODE MATERIAL FOR LITHIUM BATTERY

(75) Inventors: Vadim Gorchkov, Coral Springs, FL (US); Peter Novak, Ft. Lauderdale, FL (US); Oleg Volkov, Coral Springs, FL (US)

(73) Assignee: Enerl Battery Company, Ft. Lauderdale, FL (US)

( * ) Notice: Subject to any disclaimer, the term of this patent is extended or adjusted under 35 U.S.C. 154(b) by 314 days.

(21) Appl. No.: 10/158,361

(22) Filed: May 30, 2002

(65) Prior Publication Data

US 2003/0224249 A1 Dec. 4, 2003

(51) Int. Cl.$^7$ ................................................ H01M 4/58
(52) U.S. Cl. ............................... 429/231.1; 429/231.5; 429/231.3; 429/232; 252/520.4; 252/518.1; 252/182.1; 428/697; 428/699; 428/701; 428/702; 428/325
(58) Field of Search .......................... 429/218.1, 218.5, 429/232, 231.1, 231.5, 231.3; 427/126.3; 252/182.1, 520.4, 518.1; 428/697, 699, 701, 702, 325

(56) References Cited

U.S. PATENT DOCUMENTS

| | | | |
|---|---|---|---|
| 5,322,746 A | 6/1994 | Wainwright | |
| 5,985,485 A | 11/1999 | Ovshinsky et al. | |
| 6,217,843 B1 * | 4/2001 | Homyonfer et al. | 423/593.1 |
| 6,406,814 B1 | 6/2002 | Gorkovenko et al. | |
| 6,783,890 B2 * | 8/2004 | Kweon et al. | 429/218.1 |

* cited by examiner

*Primary Examiner*—Laura Weiner
(74) *Attorney, Agent, or Firm*—Akerman Senterfitt (57) ABSTRACT

A cathode composition for lithium ion and lithium metal batteries includes a transitional metal oxide and an adsorbate layer disposed on a surface of the transitional metal oxide. The transitional metal oxide and the adsorbate layer are both electrochemically active. A method of forming cathode materials for lithium ion and lithium metal batteries includes the steps of providing reagents including at least one elemental chalcogenide or chalcogenic oxide and a transitional metal oxide. The reagents are heated, wherein a cathode composition is formed having a chalcogenic complex adsorbed to a bulk material, the bulk material being a modification of the transitional metal oxide. The transitional metal oxide is preferably a vanadium oxide.

14 Claims, 9 Drawing Sheets

CATHODE MATERIAL FOR LITHIUM BATTERY

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates to cathode materials for improved primary and secondary lithium batteries.

BACKGROUND OF THE INVENTION

The demand for new and improved electronic devices such as cellular phones, notebook computers and compact camcorders has demanded energy storage devices having increasingly higher specific energy densities. A number of advanced battery technologies have recently been developed to service these devices, such as metal hydride (e.g., Ni-MH), nickel-cadmium (NiCd), lithium batteries with liquid non-aqueous electrolytes and more recently, lithium batteries with polymer electrolytes.

Lithium batteries have been introduced into the market because of their high energy densities. Lithium is atomic number three (3) on the periodic table of elements, having the lightest atomic weight and highest energy density of any room temperature solid element. As a result, lithium is a preferred material for batteries, having a very high energy density. Lithium batteries are also desirable because they have a high unit cell voltage of up to approximately 4.2 V, as compared to approximately 1.5 V for both NiCd and NiMH cells.

Lithium batteries can be either lithium ion batteries or lithium metal batteries. Lithium ion batteries intercalate lithium ions in a host material, such as graphite, to form the anode. On the other hand, lithium metal batteries use metallic lithium or lithium metal alloys for the anode.

The highest specific Li battery characteristics are obtained when a metallic lithium comprising anode, as opposed to a lithium ion anode, is used. However, the use of Li metal comprising anodes for secondary batteries has been limited by certain known technical challenges. A major challenge is the high level of reactivity of lithium metal to a variety of substances, including most common atmospheric materials. For example, lithium metal is known to react with atmospheric gases, such as $O_2$, $N_2$, $CO_2$, $H_2O$ and $SO_2$. Reaction of metallic lithium with any of the above reagents can produce compounds which are generally insoluble in the electrolytes used and result in degradation in electrochemical properties of the anode and the electrochemical system as a whole.

Based on a decreasing degree of activity with respect to pure lithium, the common atmospheric substances shown below can be placed in the following order:

$$SO_2 > O_2 > CO_2 > H_2O > N_2.$$

The compounds positioned to the left supplant the reagents they are followed by or block their interaction with lithium metal. An exception is water, which generally strengthens the activity of other active atmospheric reagents when present.

It is also known that lithium metal containing anodes can react with certain non-aqueous electrolytes, such as solutions of lithium salts ($LiClO_4$, $LiAsF_6$, $LiPF_6$, etc.) in organic liquids such as propylene carbonate, ethylene carbonate and dimetoxyethane, and produce an alkyl carbonate film on the surface of the lithium anode, which further transforms into carbonate films. The electrolyte salts can also take part in forming these films, for example $LiClO_4$ or $LiAsF_6$, admixtures of water, or carbon dioxide which may be dissolved in the electrolyte. The formation of these films and deposition on the surface of the lithium containing anode when charging the electrochemical cell can result in encapsulation of the anode. Lithium encapsulation can result in the loss of electrical and mechanical contact within the active anode result in a loss of capacity.

Under multiple deep cycling, the electrode structure can become highly disordered which can render the electrochemically active metal substantially inactive. Thus, multiple cycling can result in a significant reduction in capacity of the secondary power source. This situation can be exacerbated by the tendency of lithium to form dendrites due to electrolytic deposition.

The growth of dendrites which penetrate through the secondary battery separator can lead to short circuits between the cathode and anode. System shorts can lead to thermal destruction of the power source. Although electrode films can impede electrode performance, some electrode surface films can provide certain benefits. For example, some surface films can to make the anode and/or the cathode surfaces passive.

When metallic lithium is included in the anode of an electrochemical cell, cathode materials are generally selected which provide low equivalent mass, such as oxides or fluorides of relatively light elements, preferably being in their highest oxidation states. The specific capacity of the cathode material is proportional to the number of electrons participating in cathodic reaction and in reverse proportion to the molecular mass of this material. In most cases, simple and complex oxides of transitional 3d metals are used.

Among the transition metal oxides available, crystalline vanadium oxides are commonly used. Vanadium oxides provide a relatively low equivalent mass and high oxidation states, such as +5 and +4, which allows cathodes to provide high specific capacity and favorable power characteristics to be obtained. Common vanadium oxides include $V_2O_5$, $V_3O_7$, $V_4O_9$, $V_6O_{13}$, $V_{O2}(B)$. For example, $V_2O_5$ provides a specific energy density that is generally up to approximately 260 Wh/kg.

Although available vanadium oxide cathodes provide low self-discharge, these materials cannot provide high discharge current characteristics. Moreover, they generally exhibit an undesirable two-stage discharge curve.

Some lithium batteries having vanadium oxide cathodes demonstrate substantially flat discharge curves and may provide high specific characteristics. However, obtainable discharge characteristics have been too low to be useful for most applications because of a rapid decrease in energy density during cycling. A decrease in energy density upon cycling is believed to be primarily caused by the formation of stable lithium vanadates that do not take part in the electrochemical reaction. A similar mechanism of degradation of electrochemical characteristics is also typical for the other known non-vanadium oxide cathode materials.

For example, $V_6O_{13}$ can provide up to 600 Wh/kg of practical energy density for a primary battery. However, this material can only be cycled to a 10% to 15% of depth with respect to a primary battery.

Amorphous oxide $V_2O_5$ has been suggested to overcome some of the limitations of the corresponding crystalline vanadium oxide materials. Amorphous $V_2O_5$ generally provides a smoother discharge curve in comparison with crystalline vanadium oxide, but does not provide a significant improvement in cycling characteristics.

Thus, the high theoretical characteristics potentially providable by transitional metal oxides cathodes for lithium ion and lithium metal batteries have not been realized by available cathode materials.

SUMMARY OF THE INVENTION

A cathode composition for lithium ion and lithium metal batteries includes a transitional metal oxide and an adsorbate layer disposed on the surface of the transitional metal oxide. Both the transitional metal oxide and the adsorbate layer are electrochemically active. As used herein, the phrase "lithium metal" includes metallic lithium and lithium metal alloys.

The transitional metal oxide preferably includes at least one vanadium oxide and is provided in a substantially amorphous state, the amorphous state being no more than 10% crystalline. In a preferred embodiment of the invention, the vanadium oxide satisfies the formula $VO_x$, where $2.25<x<2.5$.

The adsorbate layer is preferably a chalcogenide complex or a related oxide. The term "chalcogenide" as used herein refers to the group of elements sulfur, selenium and tellurium. The chalcogenide complex can comprise 0.05% to 25 wt % of the composition. The chalcogenide complex can be S, SO, $SO_2$ or $SO_3$ in the following concentrations: S from 0.05 to 20 wt %, SO from 0 to 5 wt %, $SO_2$ from 0.05 to 10 wt % and $SO_3$ from 0 to 5 wt %. Alternatively, the chalcogenide complex can include Se, SeO, $SeO_2$ or $SeO_3$ in the following concentrations: Se from 0.05 to 20 wt %, SeO from 0 to 5 wt %, $SeO_2$ from 0.05 to 12 wt % and $SeO_3$ from 0 to 8 wt %. The chalcogenide complex can also include Te, TeO, $TeO_2$ or $TeO_3$ in the following concentrations: Te from 0.05 to 20 wt %, TeO from 0 to 5 wt %, $TeO_2$ from 0.05 to 15 wt % and $TeO_3$ from 0 to 10 wt %.

The chalcogenide complex can be formed from a plurality of chalcogens. For example, the composition can include S, SO, $SO_2$, $SO_3$, Se, SeO, $SeO_2$, $SeO_3$ Te, TeO, $TeO_2$, $TeO_3$ in the following concentrations: total of S, Se, Te from 0.05 to 25 wt %, total SO, SeO, TeO from 0 to 5 wt %, total $SO_2$, $SeO_2$, $TeO_2$ from 0 to 12 wt % and total $SO_3$, $SeO_3$, $TeO_3$ from 0 to 8 wt %.

The cathode composition can include a plurality of particles, the average size of the cathode material particles being less than 20 microns. In this embodiment, the specific surface area of the particles is preferably at least 0.5 $m^2/g$.

A method of forming cathode materials for lithium ion or lithium metal batteries includes the steps of providing reagents including at least one elemental chalcogenide or chalcogenic oxide and a transitional metal oxide. The reagents are heated, wherein a cathode composition is formed having a chalcogenide complex adsorbed to a bulk material, the bulk material being a modification of the transitional metal oxide. The method includes the step of providing an oxygen partial pressure, the oxygen partial pressure being between $10^{-7}$ to $10^{-19}$ atmospheres. The bulk material formed includes vanadium oxide ($VO_x$), wherein $2.0 \geq x \geq 2.5$. The heating step is performed at a temperature of between approximately 150° C. and 250° C.

The elemental chalcogenide or chalcogenic oxide can include elemental sulfur or sulfur oxide compounds, where the sulfur or sulfur oxide compounds are added to vanadium oxide up to 1 mole per $VO_x$ formula (V/S ratio$\leq 1$), the heating step being performed at a temperature of between approximately 150° C. and 250° C. Alternatively, the elemental chalcogenide or chalcogenic oxide can include elemental selenium or selenium oxide compounds, where selenium is added to vanadium oxide up to 1 mole per $VO_x$ formula (V/Se ratio$\leq 1$), the heating step being performed at a temperature of 150 to 230° C. As a further alternative, the elemental chalcogenide or chalcogenic oxide can include elemental tellurium or tellurium oxide compounds, where tellurium is added to vanadium oxide up to 1 mole per $VO_x$ formula (V/Te ratio$\leq 1$), the heating step being performed at a temperature of 150 to 250° C.

The elemental chalcogenide or chalcogenic oxide can be formed from a plurality of chalcogens. For example, the chalcogenide or chalcogenide compound can be selected from sulfur, selenium and tellurium and their compounds to vanadium oxide up to 1 mole of chalcogenide per $VO_x$ formula (V/Chalcogenide ratio$\leq 1$).

The reactants used to form the cathode material can include elemental sulfur and vanadium pentoxide. Sulfur and vanadium pentoxide are preferably provided in a weight ratio from 1:12 to 1:8 and heated at a temperature of 165 to 185° C. in a sulfur dioxide medium for 15 to 60 minutes with an oxygen partial pressure of $10^{-9.5}$ to $10^{-12}$ atmospheres. Alternatively, selenium and vanadium pentoxide can be provided in a weight ratio from 1:15 to 1:8, where the heating step performed at a temperature of 175 to 200° C. in a selenium dioxide medium for 15 to 60 minutes, at partial pressure of oxygen from $10^{-8}$ to $10^{-13}$ atmospheres.

An electrochemical cell includes a lithium ion or lithium metal containing anode and a multiphase cathode. The multiphase cathode includes a transitional metal oxide layer and an adsorbate layer disposed on a surface of the transitional metal oxide layer. The adsorbate layer can include chalcogenide complexes or their oxides. The transitional metal oxide and the adsorbate layer are both electrochemically active. An electrolyte is provided that is operatively associated with the anode and the cathode.

The transitional metal oxide preferably includes at least one vanadium oxide. The metal oxide is preferably in a substantially amorphous state, the oxide matrix containing no more than 10% crystalline content. Vanadium oxide preferably satisfies the formula $VO_x$, where $2.25<x<2.5$.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

Conventional cathode materials for lithium metal and lithium ion batteries generally utilize single phase, crystalline transitional metal oxide materials, such as vanadium oxide. The invention involves formation of a multiphase, non stoichiometric cathode material. The multiphase cathode composition can be provided having a surface material, which is distinct from the bulk cathode material. For example, the surface of the active cathode material, generally being a transition metal oxide with slightly acid properties, can be covered by a chemically distinct surface layer, the surface layer preferably also being of an acid nature. Preferably, the surface layer is adsorbed on the surface of the bulk cathode material, as opposed to being chemically bonded thereto.

Acidic surface layers are preferred because such layers are more chemically active than water and carbon dioxide. This prevents the formation of lithium carbonate and hydroxide non-conductive films on the cathode material surface. In addition, the highest oxide states of transitional metals generally are of an acidic or amphoteric nature. As a result, these oxides do not significantly react with weak acid reagents. Therefore, surface layers formed on acidic cathode material grain surfaces are relatively stable. Certain salt oxide and carbonate films formed on a transitional metal cathode surface, such as in the case of sulfur, $Li_2S$, $Li_2SO_2$, $Li_2S_2O_2$ and $Li_2SO_3$ have been identified as being capable of stopping dissolved gases in the electrolyte as well as certain non-aqueous electrolytes from reacting with the cathode. These films possess ionic conductivities of up to about $2.5 \times 10^{-3}$ $A/cm^2$. This value is on the order of the cathode electron and ion resistance, or the specific electrolyte resistance. Therefore, ion transfer through these films does not generally determine the speed of the electron reaction on the anode because the electrode reaction is limited by the velocity of slowest partial process. When the velocities of the partial reactions have similar values, the overall reaction velocity is generally maximized. Assuming that the speed of the electrochemical reaction is determined by the concentration of the reaction components, such as Li, $Li^+$ and $e^-$, in order to achieve good current characteristics and provide high power, the cathode material should possess a structure that provides fast diffusion of electrons, and/or holes and the potential for forming ions in its structure.

The surface material is preferably more reactive to common atmospherics, such as $CO_2$ and water, as compared to the bulk cathode material. Atmospheric gases are generally present in the environment surrounding the assembly equipment and within certain materials used during assembly. Since the adsorbed surface layer selected does not form a chemical bond with the transition metal oxide cathode, there is a resulting "metal" surface protected by the surface layer, upon which adsorption and recharging can effectively take place, even though a chemical bond is not formed between the surface layer and the bulk cathode material.

The adsorbed surface layer can be provided by any suitable technique. For example, a variety of coating techniques may be used, such as spray techniques and deposition processes including chemical vapor deposition (CVD), evaporation and sputtering. Spray techniques can include thermal spray, electrospray and atmospheric pressure chemical ionization.

However, in one embodiment of the invention, a single chemical or two or more chemicals can be provided to the electrochemical cell which result in the formation and placement of an adsorbed surface layer on at least one of the electrode surfaces. This chemical can be dissolved in whole or in part in the electrolyte. Some surface layer producing chemicals can form surface layers on both the cathode and Li metal anode surface. Thus, the selection of appropriate surface layer forming chemicals, such as the chalcogens and their oxides described herein, can prevent the formation of insulating films on anodes as well as prevent formation of dendrites on the Li containing anode surface.

Assuming that dissolved chemicals are used to produce the adsorbed surface layer, products formed by a reaction between the lithium metal anode and the dissolved component can provide high ionic conductivity. For example, lithium sulfur dioxide ($LiSO_2$) films can be formed. $LiSO_2$ films provide better ionic conductivity compared to carbonate, hydroxide and lithium oxide which are generally formed by reaction of lithium metal with atmospherics. Therefore, unlike layers formed from exposure to the atmosphere, anode surface layers formed using the invention will not generally create a significant electrochemical barrier.

In a preferred embodiment of the invention, the cathode material can be prepared according to the following chemical reaction, where the transitional metal oxide is a vanadium oxide:

(1)

Where $VO_x^{matrix} \cdot ChO_y^{ads}$ is the target product, n can equal 0, 2 or 3 and y is the stoichiometric coefficient of the oxychalcogenide complex formed. As noted earlier, chalcogenide (Ch) refer any of the elements which share same column in the periodic table as oxygen, such as S, Se and Te.

Coefficients of the above reaction are connected by material balance equations 2 and 3 shown below:

(2)

Equation 2 above represents the condition for material balance of the chalcogenides.

(3)

Equation 3 above represents the condition for material balance for oxygen.

A process for preparation of cathode material can be described as follows. At a selected synthesis temperature, a chalcogenide interacts with a crystalline transitional metal oxide, such as vanadium oxide. The resulting product is a partially reduced and the metal oxide (e.g. vanadium oxide) which loses its crystal structure to a significant extent. Gas is also evolved by the reaction. As a result of the reaction, the vanadium oxide volume changes and the transitional metal material become dispersed, forming a matrix. The product formed is substantially amorphous, having a dispersed crystalline admixture, which emerges as a result of non-equilibrium nature of reaction (1), and a chemically distinct active surface layer on the matrix material. The gas phase reaction products and chalcogenide excess react to form the surface layer on the matrix surface.

The synthesis of the cathode material includes the steps of preparing the mixture of oxide and chalcogenide and then heating the mixture in a reactor under controlled partial pressure of gaseous components, such as $O_2$. The transitional metal oxide and chalcogenide particles preferably have a size of not more than approximately 25 $\mu$m. Such particles can be provided by milling or other suitable methods. It is generally important to avoid use of grinding apparatus which can introduce metal into the milled particles produced.

The reagents can then be optionally dried after milling or by analogous processes. Following drying, the respective transitional metal oxide and chalcogenide reagents are preferably weighed so that the respective amounts provided to the reactor may be based on the reaction stoichiometry. The reactants can then be mixed to produce a substantially homogeneous mixture.

The mixture provided can be placed into a reactor under a low oxygen partial pressure environment. A low oxygen partial pressure atmosphere can be created by evaluating the reactor to a residual pressure of approximately $10^{-4}$ to $10^{-5}$ atmospheres and pumping in an inert or unreactive gas. For example, dry nitrogen, argon or helium can be used to produce an oxygen partial pressure of about $10^{-4}$ to $10^{-6}$ atmospheres. The reactor temperature is then raised to the desired heating temperature for the time specified in the specific process.

Oxygen partial pressure can be controlled by a suitable gas control system. The system can include a solid-state electrochemical oxygen sensor and pump, such as one produced from zirconium dioxide and stabilized by scandium oxide. Following processing at an elevated temperature, such as 125° C. to 350° C., the reactor can then be cooled to a temperature of about 50° C., and pumped out up to a residual pressure of $10^{-4}$ to $10^{-5}$ atm. The reactor can be filled with the dry inert gas to protect the material formed from oxidizing and hydrating during storage and transportation because under an ambient atmosphere, the material actively absorbs water vapors. If concentration of water in the material becomes significant, there is a possibility of matrix hydration and oxidation, and, as a result, loss of the second component (surface component) and possible cathode material decomposition.

Figure 1:
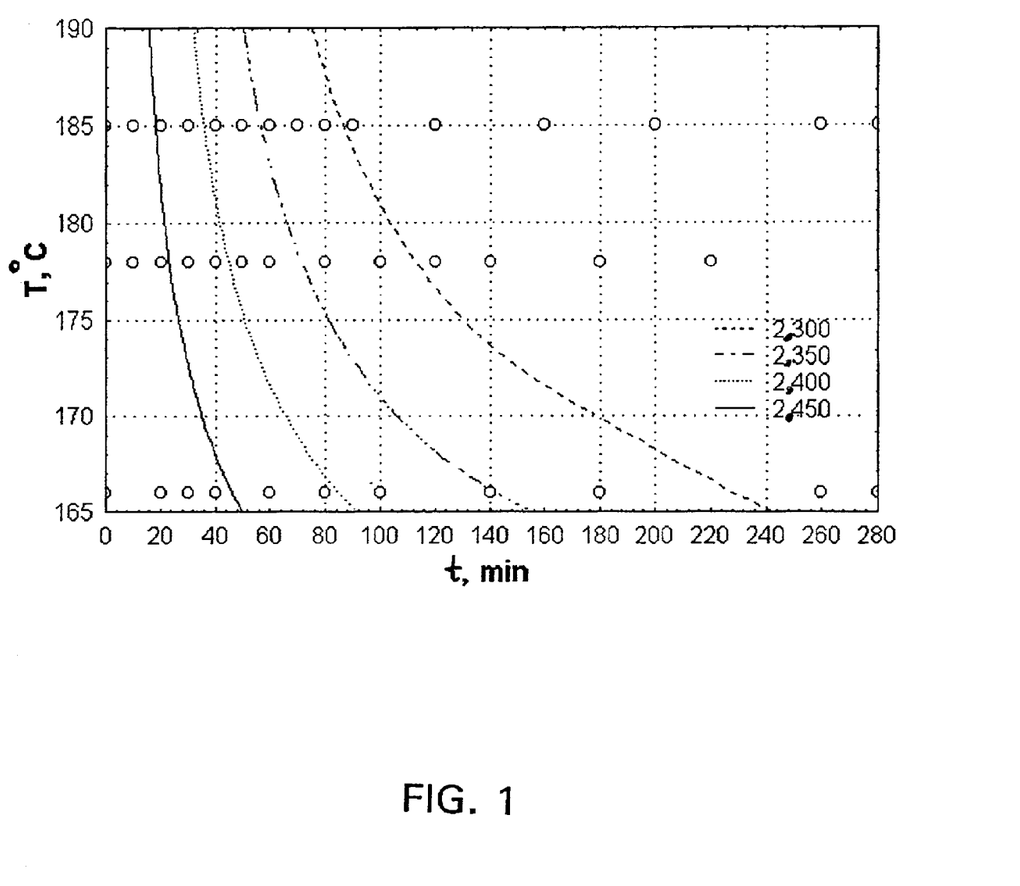
FIG. 1 is a time-temperature diagram showing resulting isolines of oxygen coefficient x for a product having the formula VOx, produced by a chemical system which includes vanadium, oxygen and sulfur reactants.

Conditions for cathode material synthesis in the case of a vanadium, oxygen, sulfur (V—O—S) system is described below in Examples 1–3. FIG. 1 shows experimentally determined isolines of oxygen coefficient x of a vanadium oxide product VOx as a function of temperature and time of heating at the high processing temperature used. Resulting X values shown vary from 2.3 to 2.45.

Figure 2:
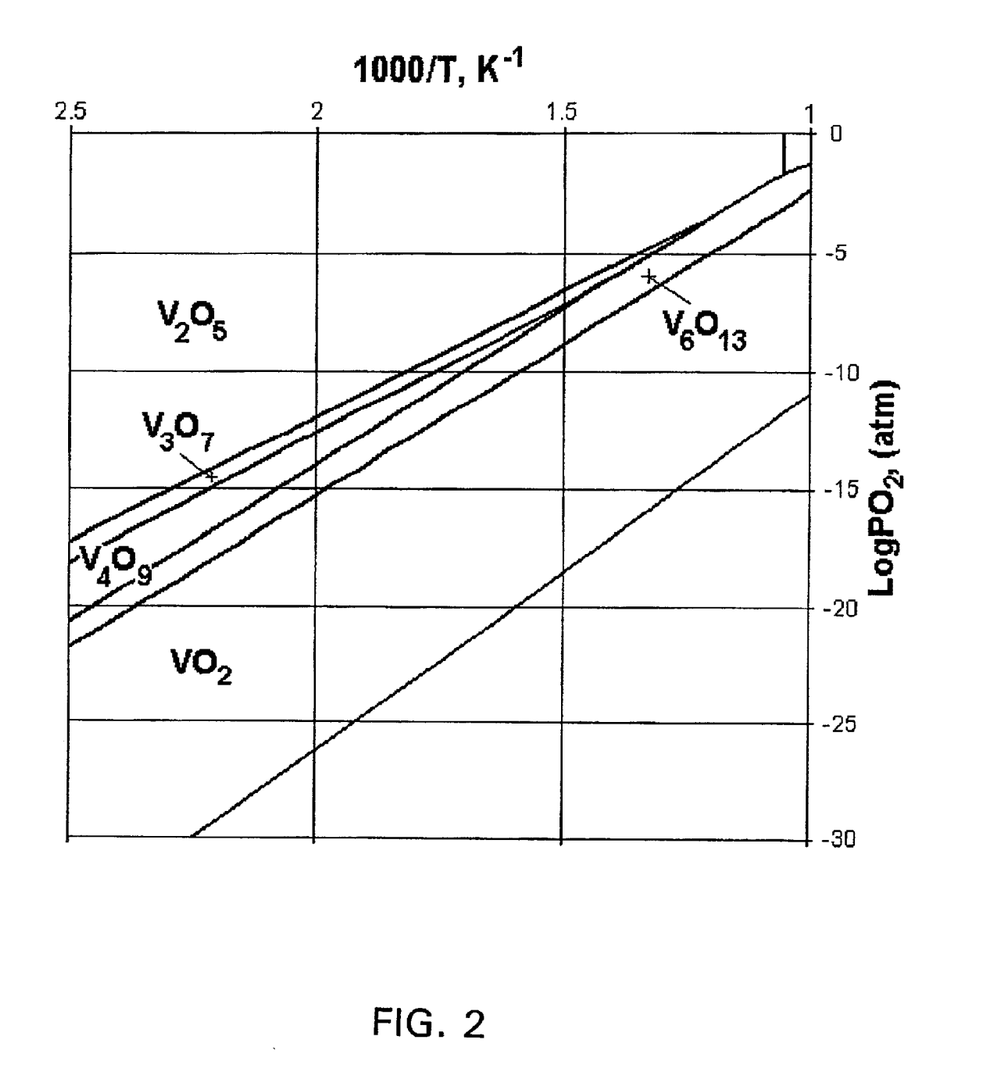
FIG. 2 is a log $PO_2$ vs. 1000/T diagram for the formation of various vanadium oxide compositions.

FIG. 2 demonstrates that cathode material synthesis according to the invention is possible. It was established that vanadium oxide $V_3O_7$ ($VO_{2.33}$) should exist formally within the isolines shown in FIG. 1. However, vanadium oxide $V_3O_7$ ($VO_{2.33}$) was never obtained. This provides evidence that the reaction conditions are not in equilibrium with the end product caused by the chalcogenide and the presence of its oxides in the system. During the process, until the oxygen index reaches the x=2.25 level, the product is vanadium oxide $V_4O_9$ (See Theobald F., Cabala R., Bernard J. Action menagee de certains reducteurs $V_2O_5$: mise en evidence de l'oxide $V_4O_9$. C.r.Acad.sci., Paris, 1969, V.269, N 20, pp.1209–1212).

Therefore, to substantially avoid the appearance of known crystal phases in the cathode material, the preferred area is where the isoline is at or below X=2.30. At temperatures above 200° C., essentially the whole product formed consists of crystal phases such as $V_4O_9$ and $V_2O_5$. At temperatures below 150° C., the reaction proceeds extremely slowly. Thus, the preferred reaction temperature for vanadium oxide cathode formation is between 150° C. and 200° C. Depending on synthesis time and temperature, the amount of crystalline impurity phases and the average particle size of the product can also be controlled.

Turning now to structural aspects of the cathode material, the cathode material formed using the invention is generally substantially amorphous, with a crystalline vanadium oxide content not exceeding approximately 10%. The actual crystalline concentration was found to depend on conditions of formation process. The nature of the distribution of the impurity crystalline grain sizes was found to depend on the processing conditions and particle size range of the initial chalcogenide and transitional metal oxide reagents.

Due to the non-equilibrium nature of reaction (1), the formation of thermodynamically stable oxides, such as $V_3O_7$, $V_6O_{13}$, $V_4O_9$, $VO_2$ will occur to some degree. Their concentrations and other characteristics depend on reaction time and temperature, chalcogenide concentration and chemical impurities level (such as other transition metal and alkaline metal oxides) in raw materials in accordance with the principles of chemical thermodynamics. The invention provides conditions which preferably minimize the formation of these crystalline impurities.

The reaction of cathode material synthesis (Equation 1) when elemental sulfur is provided as the chalcogenic reactant is characterized by the presence of solid (vanadium oxide), liquid (sulfur), free gas phases (chalcogenic oxides and oxygen) and adsorbed components within the system. Thus, the reaction is heterogeneous and its completeness and its speed depend on solid—liquid interactions (e.g. vanadium oxide—sulfur), solid—solid (vanadium oxide—selenium or tellurium) and solid—gas (vanadium oxide—oxygen, chalcogenide vapor and its oxides). The following equation for the reaction constant k is as follows:

$$k = \exp\left(-\frac{\Delta G_r}{RT}\right) = \frac{\prod_{n=0,2,3} P_{ChO_n}^{\varepsilon_n - \delta_n}}{P_{O_2}^b} \tag{4}$$

where $\Delta G_r$ is a Gibbs' potential for reaction 1, $PChO_n$ and $PO_2$ are oxychalcogenides and oxygen partial pressures in gas phase respectively, and $\varepsilon_n$, $\delta_n$, b are coefficients of reaction 1.

The equations of chalcogenide components oxidation is as follows:

$$Ch_{(gas)} + O_2 \rightarrow (ChO)_2; \tag{5}$$

$$k_5 = \exp\left(-\frac{\Delta G_{r5}}{RT}\right) = \frac{P_{ChO_2}}{P_{Ch_{(gas)}} P_{O_2}} \tag{6}$$

$$ChO_2 + 0.5O_2 = ChO_3; \tag{7}$$

$$k_6 = \exp\left(-\frac{\Delta G_{r6}}{RT}\right) = \frac{P_{ChO_3}}{P_{ChO_2} P_{O_2}^{1/2}} \tag{8}$$

Where $Gr_{5,7}$ is the Gibbs' potential of reactions 5 and 7 respectively, and

PA is a partial pressure of a relevant component A in gas phase.

Equations 4, 6 and 8 together with material balance equations 2 and 3 form a system of five equations with five unknowns. The solution of this system of equations gives quasi-equilibrium partial pressures of reaction (1) gaseous components and the coefficient of oxygen nonstoichiometry (x) for the metal-oxide matrix of cathode material for a given composition of initial reagents. However, a direct solution to the above equation is generally not possible because Gibbs' potential for the product is unknown and depends on concentrations of matrix and surface phase materials and the oxygen nonstoichiometry index of the matrix material.

The direct relationship of partial pressures of reaction (1) gas components makes it possible using the system of equations to control conditions of cathode material fabrication by partial pressure measurement of at least one gaseous reaction component. Technically, the measurement of oxygen partial pressure is generally the simplest procedure. It was determined experimentally that the level of log $PO_2$ of −13±6 is the optimal level of oxygen partial pressure within the temperature interval of 160 to 175° C. With control of oxygen partial pressure to this level, cathode materials with high quality can be obtained.

In order to analyze the processes that occur during cathode material synthesis it is helpful to consider the volume changes that generally take place during the synthesis process. The specific densities of thermodynamically stable crystal oxides in the V—O system increase smoothly as the vanadium oxidation degree decreases from degree 5 to degree 4. According to the Gibbs' phase rule, there must be two-phase areas within the intervals between individual oxide phases where mixtures of two contiguous oxides are present. Since the density of a substance is an additive value, in two-phase areas of the phase diagram the dependence of density of equilibrium mixtures is a linear function. Accordingly, the full dependence of density vs. oxidation number for individual oxides or their equilibrium mixtures for the above-mentioned oxide system is a monotonic function. Thus, in the case of an equilibrium mixture of oxides that have the same vanadium oxidation degree as the cathode material matrix as compared to the density of this matrix, information can be obtained about the degree of structural disorder in the matrix substance.

The vanadium oxidation degree for the cathode material formed as described in Example 1 below was 4.82, and the material density determined by weighting in liquid was 2.75 g/cm$^3$.

The effect on density of the adsorbed layer can generally be neglected. The mixture of equilibrium crystal vanadium oxides $V_2O_5$ and $V_3O_7$ taken in molar proportion that corresponds to vanadium oxidation average degree 4.82, would have a density of 3.45 g/cm$^3$, not the measured value of 2.75 g/cm$^3$. Thus, the increase of volume of cathode material metal-oxide matrix (from Example 1) can be estimated during synthesis. With respect to the base reagent, vanadium pentoxide amounts to 22%, and with respect to the equilibrium two-phase oxide compound, 25%. Such a significant increase of material size which occurs during the reaction demonstrates an essential difference between the matrix material formed and known vanadium oxides and evidences a significant change in microstructure, specifically being matrix material amorphization.

This also explains the reaction dispersion of the material, because such a size change leads to the appearance of high levels of mechanical stress in the material during synthesis and the destruction of the substance micro particles. Gas emission during the course of the reaction also advances the process.

For example, in Example 1 described below, there is about 0.7 liters of gas evolved per 1 gram of material for vanadium reduction from oxidation degree 5 to 4.82. Such processes take place in many other solid-state reactions bound up with redox processes, which are accompanied by gas exchange. However, in most cases, the processes of product grain growth that lead to the contrary proceed simultaneously.

Minimization of crystal character of the cathode material is accomplished by a process, which produces slow grain growth. Slow grain growth can be achieved using a low reaction temperature and a surface layer, which can block the agglomeration of material grains or their diffusion growth. The resulting cathode material microstructure consists of an isolated matrix of crystalline grains with a surface adsorbate layer. Such a microstructure permits cathodes to be formed, which provide near theoretical limits of capacity at high discharge current densities as shown in Example 5 below.

EXAMPLES

Example 1

Elemental sulfur and vanadium oxide $V_2O_5$ were mixed as initial reagents in a weight ratio of 1:10 and heated to a temperature of 170° C. for 50 minutes in an argon atmosphere. The average particle size of the reagents was about 50–70 mkm. The initial oxygen partial pressure was $2 \cdot 10^{-5}$ atmospheres. During the reaction, the first 10–15 minutes, oxygen partial pressure was decreased to $10^{-11.5}$ atmospheres and was kept at this level for the remainder of the process.

Figure 3:
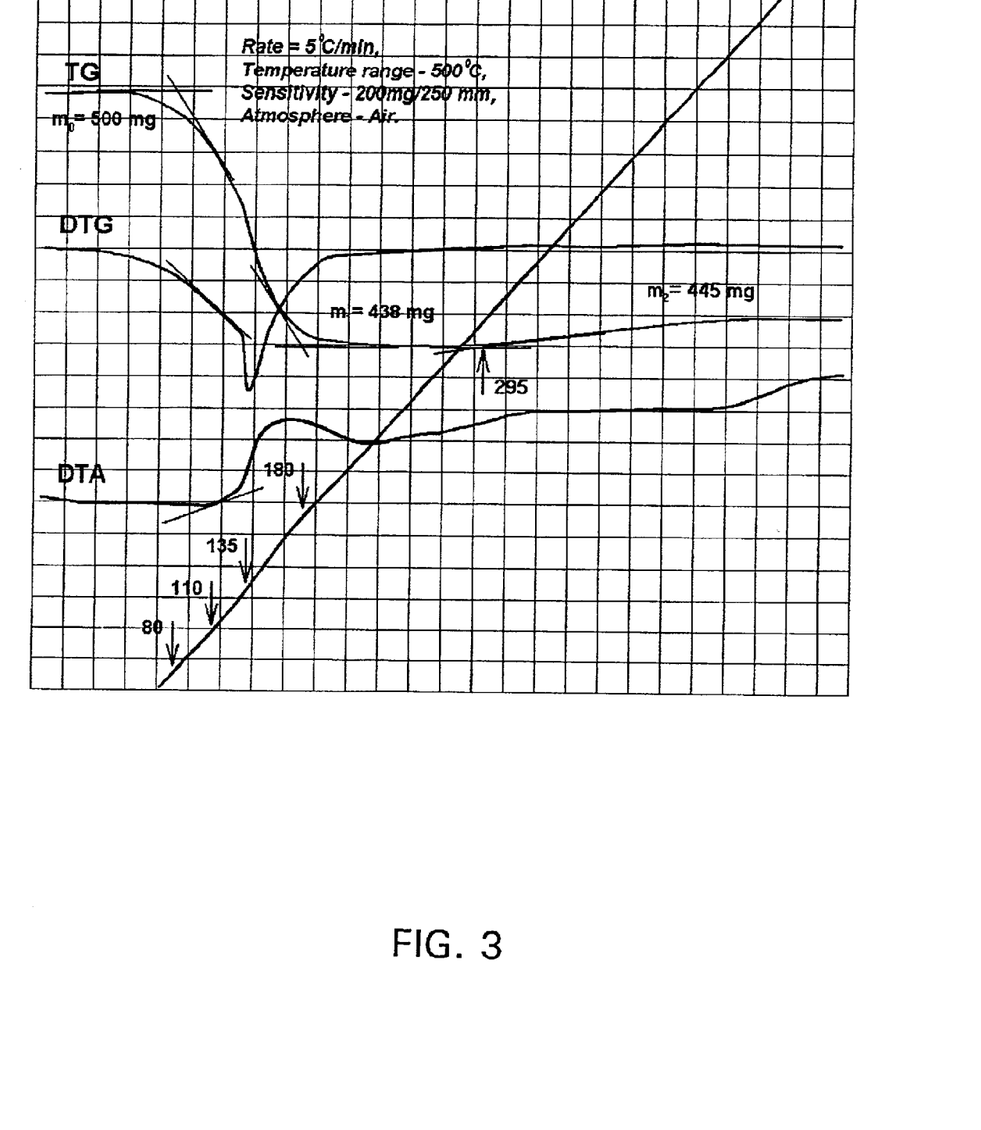
FIG. 3 is a graph showing TGA/DTA results for cathode materials produced using conditions described in Example 1.

FIG. 3 represents the results of thermo-gravimetric analysis (TGA) and differential thermal analysis (DTA) testing for the cathode material formed according to Example 1. The measurements were performed in the air. Two stages of weight change can be identified on FIG. 3. The first one begins at a temperature of about 100° C. and is accompanied by a DTA jump and exothermic effect. It was found that there was a loss of sulfur complexes at the first stage equal to up to 3.50% of the primary mass at the first stage. Sulfur and its oxides are desorbed at this stage, sulfur through the evaporation and oxidation, and its oxide through the evaporation. As a result, the intermediate product at this step represents a substantially pure oxide matrix.

A second stage begins at 295° C. and ends at approximately 500° C. Here, oxidation of non-stoichiometric vanadium oxide to vanadium pentoxide ($V_2O_5$) takes place. This occurrence is evidenced using X-ray phase analysis results of the formation of is a mixture of $V_4O_9$ and $V_2O_5$ product by heating the tested cathode material up to 280° C. in air. When the product is heated up 500° C. in air it becomes a single-phase vanadium pentoxide. The coefficient of oxygen nonstoichiometry X is determined by mass growth at the second stage. It was found to be equal to 2.411. The oxygen coefficient amount was confirmed by chemical analysis methods where it was found to be 2.412. Chemical analysis methods were also used to determine the content of sulfur complexes in the cathode material. In the chemical method, sulfur complexes are transferred into a solution for analysis as S, $SO_2$ and $SO_3$. The content of the sulfur components were found to be (in weight percents):

| | |
|---|---|
| S | 3.40% |
| SO$_2$ | 0.096% |
| SO$_3$ | 0.018% |
| Sum | 3.514% |

Matching of thermogravimetric and chemical analyses allows the definition of the oxygen coefficient and the content of sulfur complexes in the cathode material with high precision. Thus, it was determined that the chemical content of the cathode material, demonstrated in this Example, was the following (in weight percent):

| | |
|---|---|
| Metal-oxide matrix | 96.59% |
| Surface adsorbed phase | 3.41% |

Additional research was performed to determine the thermodynamic stability of the cathode material formed and to determine a quasi-equilibrium in the partial pressure of oxygen. The research included a determination of oxygen partial pressure above the sample during sample processing in the reactor.

Figure 4:
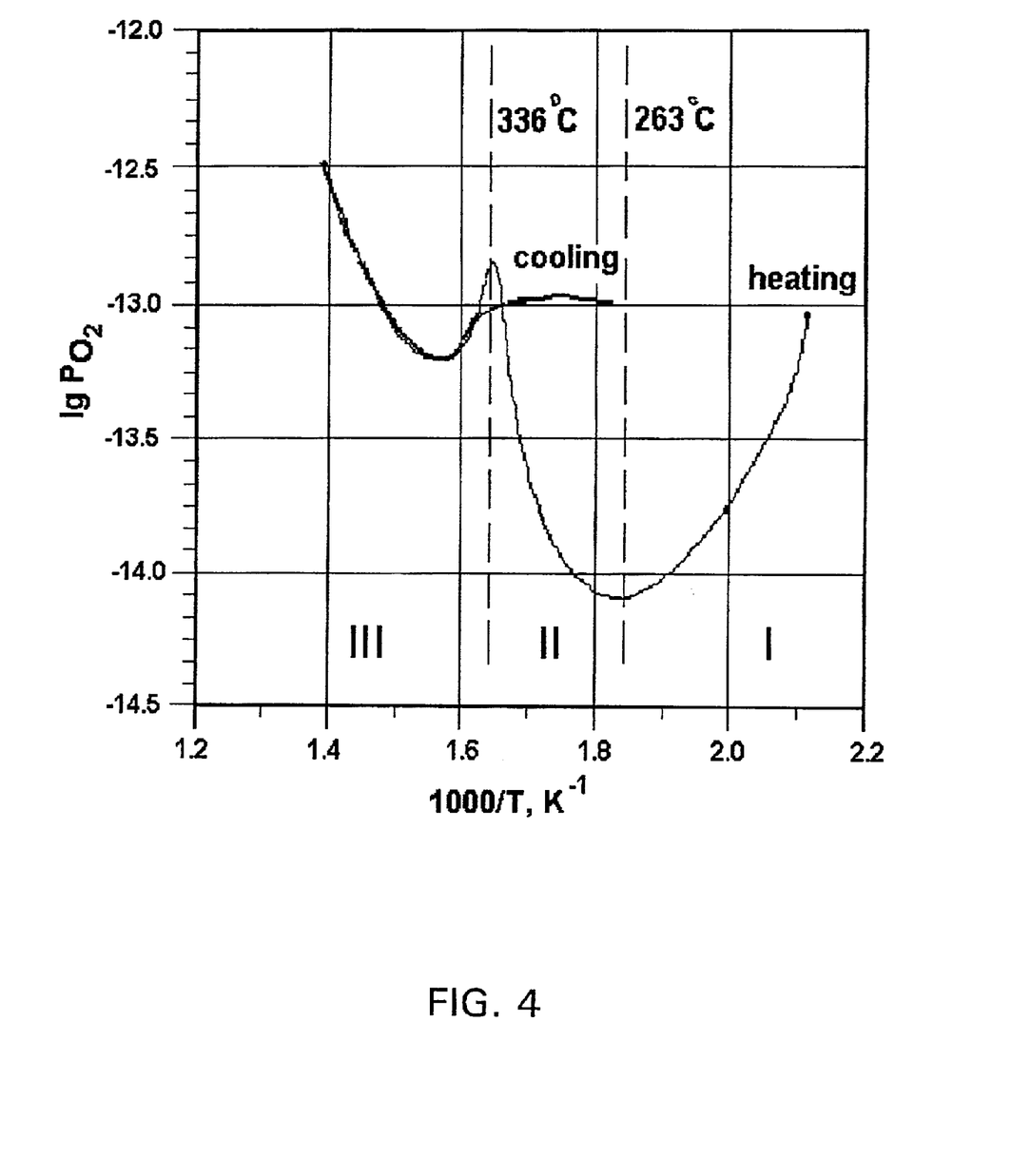
FIG. 4 is a 1000/T vs. log $PO_2$ diagram for cathode material produced using the conditions described in Example 1, where $PO_2$ is measured above the heated sample.

FIG. 4 illustrates the results of the research. Helium was used with an oxygen partial pressure (PO$_2$) of $10^{-4}$ atmospheres to limit sample oxidation otherwise using the method described in Example 1. Three (3) areas are marked on the graph as I, II and III. Each region represents a range of processing temperatures. The first one (I) represents temperatures below 263° C., a typical process of atmosphere equilibration with solid phase proceeds, which features a decrease in oxygen partial pressure above the sample with increasing temperature. In the second region (II), PO$_2$ grows as the temperature is increased, which is typical of a solid/gas equilibrium. This reflects a quasi-equilibrium of oxygen pressure above the sample.

The quasi-equilibrium area in region II at 263 to 336° C. on the heating curve and its position demonstrate that the cathode material is ready for oxygen exchange with gas phase reactants. In addition, it was determined that cathode material within region II possesses a higher level of oxygen partial pressure than known crystal oxides V$_4$O$_9$ and V$_6$O$_{13}$.

Within the temperature interval of 336 to 365° C., which is within region III, an abrupt transition to another equilibrium is observed, which proceeds until the final temperature of the experiment of 450° C. There is equilibrium reversibility within the temperature interval of 450 to 350° C. upon cooling.

At lower temperatures, oxygen partial pressure above the sample does not measurably change. This indicates the absence of oxygen exchange between the atmosphere and the sample. According to X-ray phase analysis, the final cathode material is a two-phase compound of V$_3$O$_7$ and V$_2$O$_5$. Thus, the cathode material irreversibly passes into a mixture of crystal oxides at about 336° C. and low partial pressure of oxygen, which demonstrates non-equilibrium.

Figure 5:
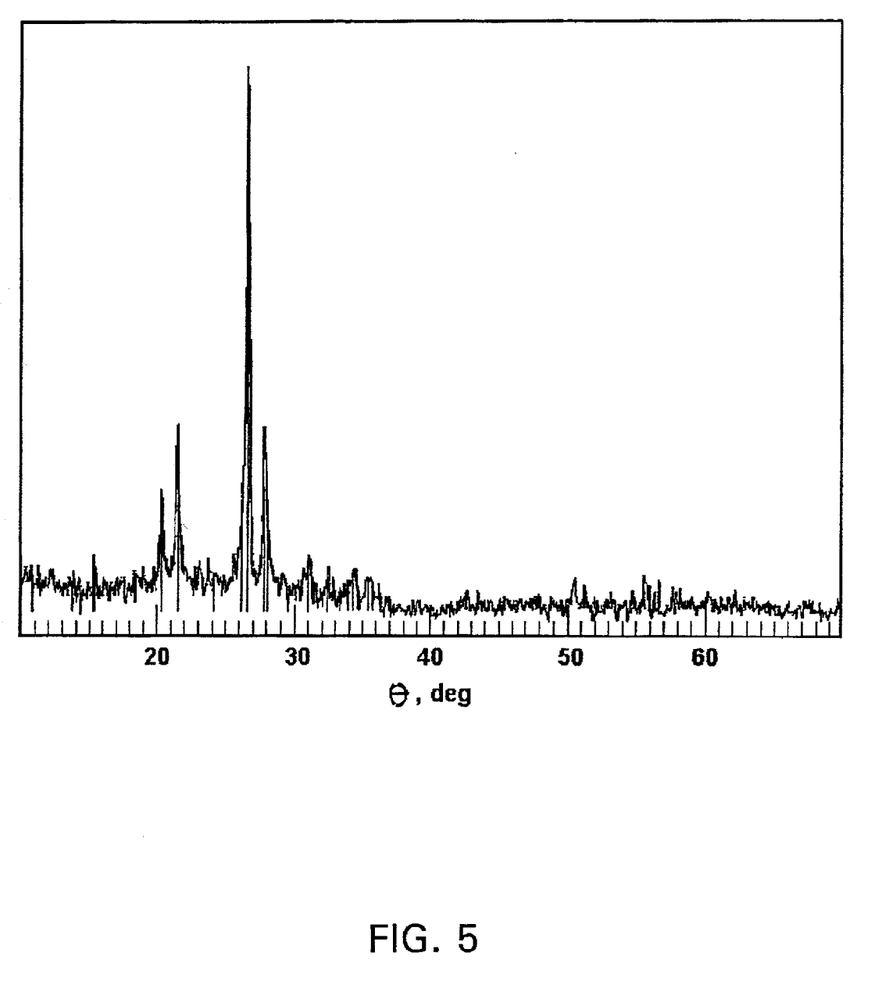
FIG. 5 is an X-Ray diffraction pattern of the cathode material produced using conditions described in Example 1 showing an essentially amorphous material.

X-ray phase analysis was used to determine the crystal structure of the resulting cathode material. The results are shown in FIG. 5. For a quantitative determination of crystalline phase content of the cathode material an inner standard survey method was used. Graphite in concentration of 9 mass percent was used as an inner standard. The contents of crystal phases in cathode material were determined using mass absorption coefficients. FIG. 5 shows that the most significant spectrum line is the graphite line with 2θ=26.64°.

Comparatively weaker background line intensities permitted crystalline impurity concentrations of V$_2$O$_5$ at 0.95% and V$_4$O$_9$ at 0.45% to be estimated. Low concentrations of impurity phases do not substantially influence the electrochemical characteristics of the resulting cathode material.

Figure 6:
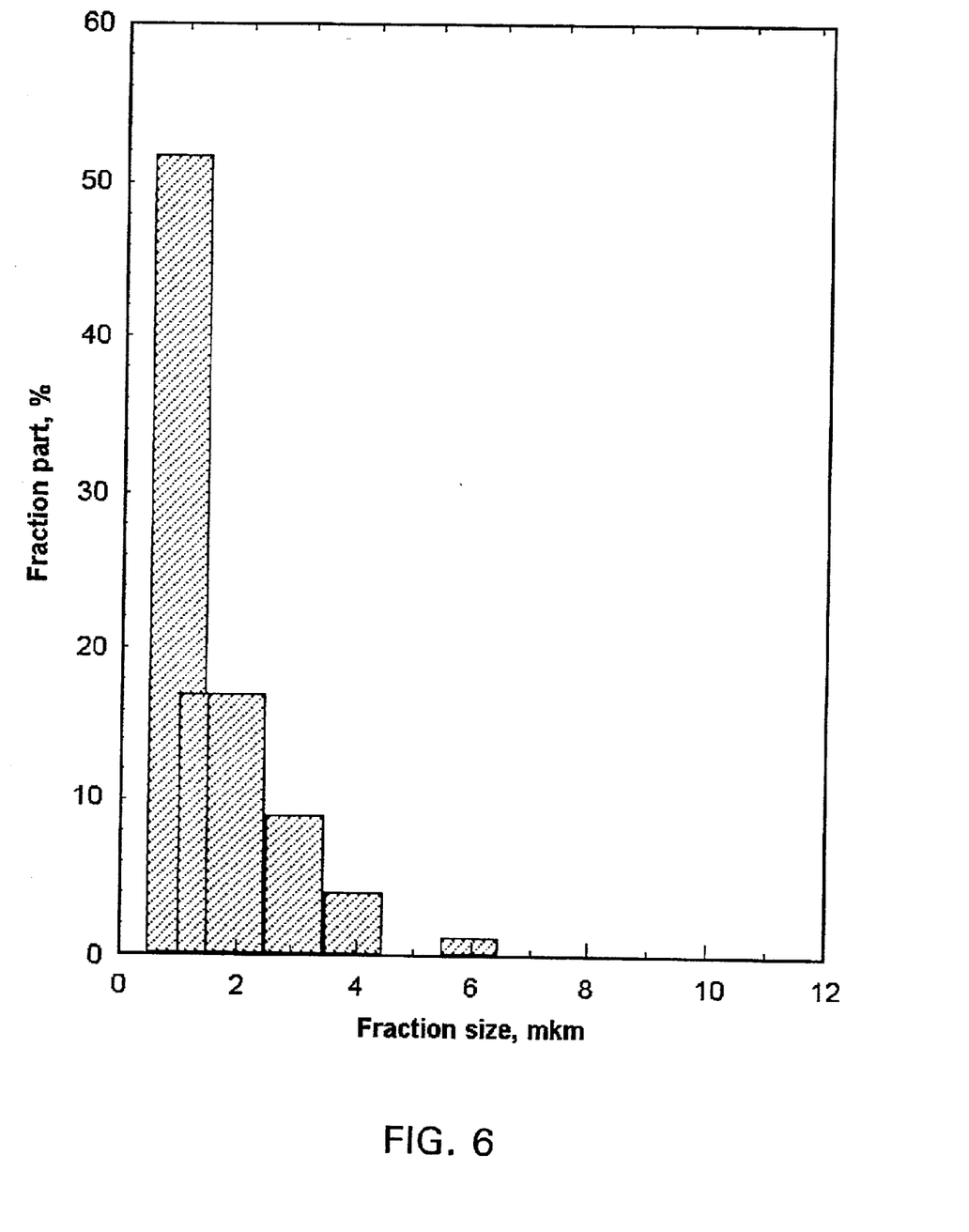
FIG. 6 is a graph showing particle size distribution for cathode material formed according to Example 1.

FIG. 6 is a graph showing particle size distribution for cathode material formed according to this Example, x-axis units being mkm. The vanadium oxidation degree for the cathode material formed was determined to be 4.82. The cathode material density determined by weighting in liquid has 2.75 g/cm$^3$, evidencing a high level of amorphization.

Example 2

Elemental sulfur and vanadium oxide V$_2$O$_5$ were selected as initial reagents in a weight ratio of 1:12. The reagents were mixed and heated at a temperature of 180° C. for 20 minutes under a flow of sulfur dioxide, with the partial pressure of oxygen being about $10^{-10.5}$ atmospheres.

From X-ray phase analysis results, it was determined that no detectable vanadium oxide crystals were present. X-ray phase results (not shown) demonstrated a broad halo with maximum at 2θ=20.1° on Cu$_{k_\alpha}$ X-ray diffraction pattern. This result is typical for amorphous materials.

From TGA chemical analysis results it was determined that the oxygen nonstoichiometry coefficient X was 2.441, and the sulfur and sulfur containing complexes content was equal to the following:

| | |
|---|---|
| S | 4.61% |
| SO$_2$ | 0.345% |
| SO$_3$ | 0.128% |
| Sum | 5.083% |

Thus, it was determined that chemical composition of the cathode material was the following (in weight percents):

| | |
|---|---|
| Metal-oxide matrix | 94.92% |
| Surface adsorbed phase | 5.08% |

Example 3

Elemental sulfur and vanadium oxide V$_2$O$_5$ were provided as initial reagents in a weight ratio of 1:25 and heated at 175° C. for 70 minutes in a sulfur dioxide atmosphere, with partial pressure of oxygen about $10^{-12}$ atmospheres. Using X-ray phase analysis, the presence of the crystalline impurities V$_2$O$_5$ (2.4%) and V$_4$O$_9$ (0.08%) were found to be present.

From TGA results and chemical analysis of the material produced, it was determined that the oxygen nonstoichiometry coefficient x was equal to 2.37, and the content of sulfur complexes was equal to the following (in weight percent):

|   |   |
|---|---|
| S | 3.05% |
| $SO_2$ | 0.088% |
| $SO_3$ | 0.014% |
| Sum | 3.152% |

Thus, it was determined that the chemical composition of the cathode material was the following (in weight percents):

|   |   |
|---|---|
| Metal-oxide matrix | 96.85% |
| Surface adsorbed phase | 3.15% |

Example 4

Elemental selenium and vanadium oxide $V_2O_5$ were provided as initial reagents in a weight ratio of 1:12. The reagents were heated to a temperature of 185° C. for 60 minutes at partial pressure of oxygen of about $10^{-11}$ atmospheres.

X-ray phase analysis of the resulting product showed the presence of crystalline impurities being $V_2O_5$ (7.3%) and $V_4O_9$ (0.15%). Using TGA and chemical analysis it was determined that the oxygen nonstoichiometry coefficient x was equal to 2.44, and content of the selenium complexes was the following (in weight percents):

|   |   |
|---|---|
| Se | 6.15% |
| $SeO_2$ | 0.134% |
| $SeO_3$ | 0.004% |
| Sum | 6.288% |

Thus the chemical composition of resulting cathode material was the following (in weight percents):

|   |   |
|---|---|
| Metal-oxide matrix | 93.71% |
| Surface adsorbed phase | 6.29% |

Example 5

Figure 7:
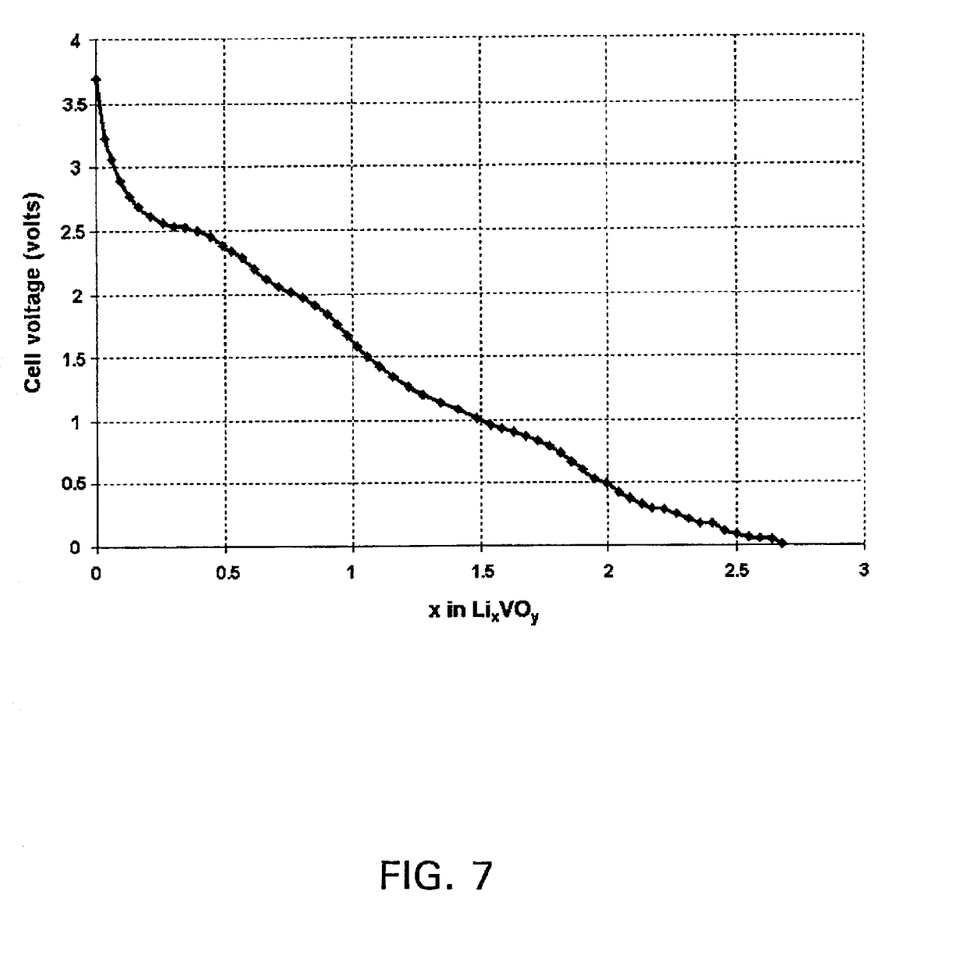
FIG. 7 is a graph showing typical cycling results for two different lithium cells having cathode materials prepared according to Example 3.

Properties regarding specific characteristics of cathode materials produced using the invention will now be demonstrated. Example 5 describes a cycling experiment performed on a lithium cell over an entire cycling depth. The typical results of cycling for two different lithium cells provided with cathode material from Example 3 are given in FIG. 7. The cathode material produced using the invention is clearly adapted for use with both primary and secondary lithium current sources.

The samples for the tests were prepared as follows. To the cathode material, 5 to 10% of carbon was provided as an electrically conductive additive and 3% of the binding polymer was added. The cathode mass was laid on a metal substrate and then dried. The tests cells were assembled in a dry box in order not to allow penetration of water vapor and carbon dioxide gas. The dependence of the specific characteristics on the cathode material layer thickness did not change in interval of current density from 0.01 to 5 mA/g.

The basic characteristics of the cathode material (Example 1) used to form a Li metal battery are given in Table 1. The characteristics relate to the pure cathode material. Pure material means that the cathode material does not contain additives such as graphite, bundle and plastificators. The material was characterized by falling and slide (see FIG. 8) discharge characteristics, having high current density, and providing high capacity and energy parameters for both primary and secondary batteries. The tests of deep cycling were conducted with an electrolyte comprising a one-molar solution of lithium perchlorate within a propylene carbonate solvent.

TABLE 1

The basic electrochemical characteristics of the cathode material.

| Characteristics | Unit dimension | Conditions of measurement | Value |
|---|---|---|---|
| Specific gravimetric capacity, the first charge, j = 1 mA/cm² | A · h/kg | Cutoff voltage - 0 V | 825 |
|  |  | Cutoff voltage - 0.75 V | 550 |
|  |  | Cutoff voltage - 1.5 V | 325 |
|  |  | Cutoff voltage - 1.8 V | 280 |
| Specific volumetric capacity, the first charge, j = 1 mA/cm² | A · h/L | Cutoff voltage - 0 V | 2230 |
|  |  | Cutoff voltage - 0.75 V | 1485 |
|  |  | Cutoff voltage - 1.5 V | 880 |
|  |  | Cutoff voltage - 1.8 V | 760 |
| Specific gravimetric energy, the first charge, j = 1 mA/cm² | W · h/kg | Cutoff voltage - 0 V | 1070 |
|  |  | Cutoff voltage - 0.75 V | 995 |
|  |  | Cutoff voltage - 1.5 V | 755 |
|  |  | Cutoff voltage - 1.8 V | 690 |
| Specific volumetric energy, the first charge, j = 1 mA/cm² | Wh/L | Cutoff voltage - 0 V | 2890 |
|  |  | Cutoff voltage - 0.75 V | 2690 |
|  |  | Cutoff voltage - 1.5 V | 2040 |
|  |  | Cutoff voltage - 1.8 V | 1860 |
| Specific gravimetric capacity, the second charge, j = 1 mA/cm² | A · h/kg | Cutoff voltage - 1.8 V | 240 |
| Specific gravimetric capacity, the second charge, j = 2 mA/cm² | A · h/kg | Cutoff voltage - 1.8 V | 140 |
| Average capacity fall within cycles 2–10 | % | Cutoff voltage - 1.8 V, j = 1 mA/cm² | 0.7 |
| Average capacity fall within cycles 11–40 | % | Cutoff voltage - 1.8 V, j = 1 mA/cm² | 0.2 |
| Average capacity fall within more than 40 cycles | % | Cutoff voltage - 1.8 V, j = 1 mA/cm² | <0.1 |
| Initial e.m.f. | V | — | 3.7–3.55 |
| Average discharge voltage | V | Cutoff voltage - 1.8 V, j = 1 mA/cm² | 2.45 |
| Voltage limits of cycling ability | V | — | 3.6–1.8 |

Figure 8:
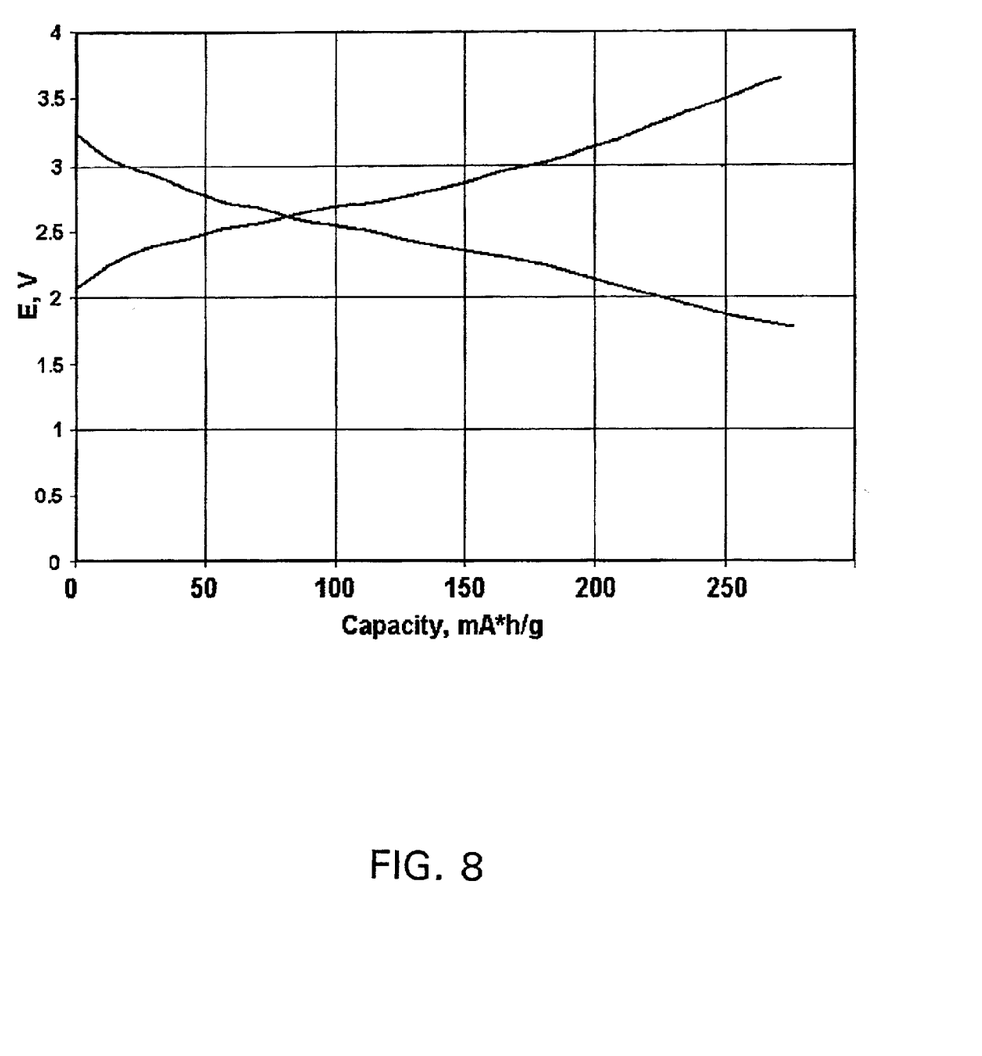
FIG. 8 is a graph showing a discharge curve for a lithium cell having cathode material prepared according to Example 2.

A significant advantage of the cathode material formed using the invention is its ability to discharge up to a final voltage equal to 0 V. The complete discharge curve, averaged on many measurements for cathodes formed under the conditions described in Example 2 is given in FIG. 8. FIG. 8 shows that the lithium/vanadium ratio in fully discharged material reaches the level about 2.7. The area of the reverse cycling is limited at the bottom by a voltage of 1.8 volts. Cathodes prepared using the invention are characterized as having low overvoltage, such as not more than 0.03 V at a current density of 1 mA/cm². At potentials lower than 1.8 V the overvoltage increases up to about 0.2 V.

Figure 9:
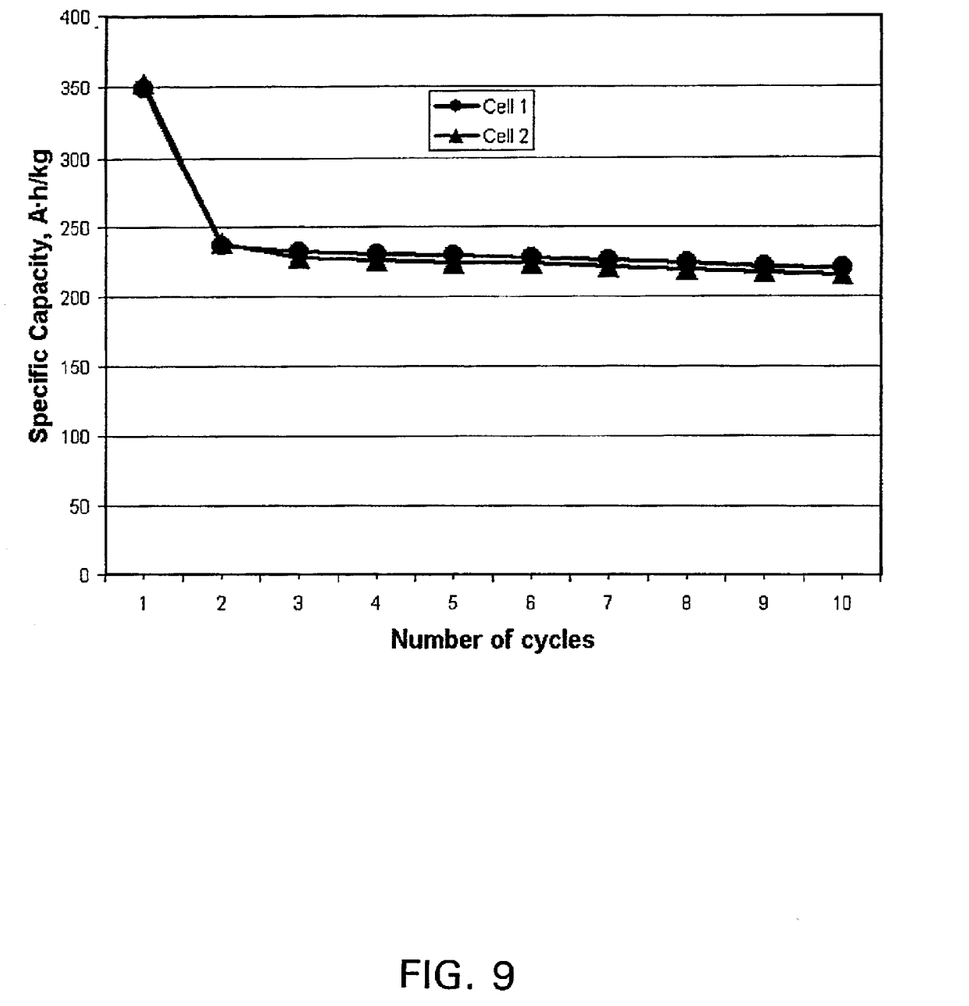
FIG. 9 is a graph illustrating a charge-discharge curve for a lithium cell having a cathode prepared according to Example 2.

A charge/discharge curve for cathode material prepared according to conditions described in Example 2 is given in FIG. 9. It is seen from FIG. 9 that both curves are substantially symmetric and that the difference in potentials between charge and discharge curves under the current density of 1 mA/cm$^2$ does not exceed 0.3 V. The 0.3 V limit is calculated by comparing the potentials of the cathode material against lithium with the same discharge state for both charge and discharge conditions.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A cathode composition for lithium ion and lithium metal batteries, comprising:
   a transitional metal oxide; and
   an adsorbate layer disposed on a surface of said transitional metal oxide, wherein said adsorbate layer comprises chalcogenide complexes or their oxides, said transitional metal oxide and said adsorbate layer both being electrochemically active.

2. The composition of claim 1, wherein said transitional metal oxide comprises at least one vanadium oxide.

3. The composition of claim 2, wherein said vanadium oxide satisfies the formula VO$_x$, where 2.25<x<2.5.

4. The composition of claim 1, wherein said metal oxide is in a substantially amorphous state, said amorphous state being no more than 10% crystalline.

5. The composition of claim 1, wherein said chalcogenide complex comprises 0.05% to 25 wt % of said composition.

6. The composition according to claim 1, wherein said chalcogenide complex or their oxides comprise S, SO, SO$_2$ and SO$_3$ in the following concentrations: S from 0.05 to 20 wt %, SO from 0 to 5 wt %, and SO$_2$ from 0.05 to 10 wt % and SO$_3$ from 0 to 5 wt %.

7. The composition according to claim 1, wherein said chalcogenide complex or their oxides comprise Se, SeO, SeO$_2$ and SeO$_3$ in the following concentrations: Se from 0.05 to 20 wt %, SeO from 0 to 5 wt %, SeO$_2$ from 0.05 to 12 wt % and SeO$_3$ from 0 to 8 wt %.

8. The composition according to claim 1, wherein chalcogenide complex or their oxides comprise Te, TeO, TeO$_2$ and TeO$_3$ in the following concentrations: Te from 0.05 to 20 wt %, TeO from 0 to 5 wt %, TeO$_2$ from 0.05 to 15 wt % and TeO$_3$ from 0 to 10 wt %.

9. The composition according to claim 1, wherein S, SO, SO$_2$, SO$_3$, Se, SeO, SeO$_2$, SeO$_3$ Te, TeO, TeO$_2$, TeO$_3$ comprise chalcogenide complexes or their oxides in the following concentrations: Total of S, Se, Te from 0.05 to 25 wt %, total SO, SeO, TeO from 0 to 5 wt %, total SO$_2$, SeO$_2$, TeO$_2$ from 0 to 12 wt % and total SO$_3$, SeO$_3$, TeO$_3$ from 0 to 8 wt %.

10. The composition of claim 1, wherein said cathode composition comprises a plurality of particles, the average size of said cathode material particles being less than 20 microns, and the specific surface area of said particles being at least 0.5 m$^2$/g.

11. An electrochemical cell, comprising:
    an anode comprising lithium ions or lithium metal;
    a cathode, said cathode including a transitional metal oxide layer and an adsorbate layer disposed on a surface of said transitional metal oxide layer, wherein said adsorbate layer comprises chalcogenide complexes or their oxides, said transitional metal oxide and said adsorbate layer both being electrochemically active, and
    an electrolyte operatively associated with said anode and said cathode.

12. The electrochemical cell of claim 11, wherein said transitional metal oxide comprises at least one vanadium oxide.

13. The electrochemical cell of claim 12, wherein said vanadium oxide satisfies the formula VO$_x$, where 2.25<x<2.5.

14. The electrochemical cell of claim 11, wherein said metal oxide is in a substantially amorphous state, said amorphous state being no more than 10% crystalline.

* * * * *